United States Patent [19]

Sullivan

[11] 4,443,056

[45] Apr. 17, 1984

[54] RETROREFLECTIVE DANGLES

[76] Inventor: Edith Sullivan, 51 Osgood St., Methuen, Mass. 01844

[21] Appl. No.: 429,548

[22] Filed: Sep. 30, 1982

[51] Int. Cl.³ .................... G02B 5/12

[52] U.S. Cl. .................... 350/98; 350/97

[58] Field of Search .................... 350/97, 98, 99; D2/27; D11/4, 5

[56] References Cited

U.S. PATENT DOCUMENTS

| | | | |
|---|---|---|---|
| 2,078,103 | 4/1937 | Simmons | 350/98 |
| 2,087,531 | 7/1937 | Sands | 350/282 |
| 2,656,763 | 10/1953 | Frost | 350/98 |
| 3,994,560 | 11/1976 | Rice | 350/98 |
| 4,091,766 | 5/1978 | Colliard | 350/98 |
| 4,140,368 | 2/1979 | Sundahl | 350/99 |
| 4,285,573 | 8/1981 | Stone | 350/99 |
| 4,407,233 | 10/1983 | Bozzacco | 350/98 |

*Primary Examiner*—John K. Corbin
*Assistant Examiner*—William Propp
*Attorney, Agent, or Firm*—Charles Hieken

[57] ABSTRACT

A pair of retroreflective strips each having an outside retroreflective surface and an inside nonretroreflective surface are stitched together with thread at one end. A strip of hooks is stitched to one inside surface and a strip of loops is stitched to the other inside surface around the edges of the respective strips to form a hook and loop fastener for detachably securing the strips around an item to enhance the visibility of the item.

6 Claims, 2 Drawing Figures

RETROREFLECTIVE DANGLES

The present invention relates in general to dangles and more particularly concerns novel apparatus and techniques for enchancing visibility with structure that is relatively inexpensive and easy to fabricate and use.

It is an important object of this invention to provide an improved dangle.

According to the invention, there are first and second retroreflective strips, means for permanently fastening the first and second strips together at one end, and means for detachably securing the retroreflective strips together at the other end to form a dangle with the retroreflective surfaces of the strips facing outside for retroreflecting light energy incident upon the dangle. Preferably the means for detachably securing comprises loop and hook fasteners with the loop strip fastened to one and the hook portion to the other of the first and second retroreflective strips. Preferably the hook and loop strips are fastened to the respective retroreflective strips by stitching along the edges of the respective strips. Preferably the two ends are permanently fastened together by stitching.

Numerous other features, objects and advantages of the invention will become apparent from the following specification when read in connection with the accompanying drawing in which.

Figure 1:
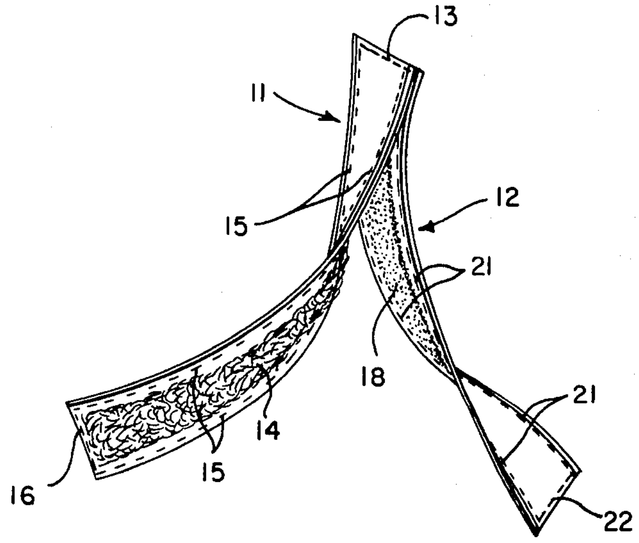
FIG. 1 is a perspective view of an embodiment of the invention open.

With reference now to the drawing and more particularly FIG. 1 thereof, there is shown a perspective view of an embodiment of the invention open. The invention comprises first and second retroreflective strips 11 and 12 each having an outside retroreflective surface and an inside nonretroreflective surface fastened together by stitching 13. A hook strip 14 is fastened to the inside nonretroreflective surface of retroreflective strip 11 by stitching 15 along the edges of the strips and 16 at the bottom. A loop strip 18 is fastened to the inside nonretroreflective surface of retroreflective strip 12 by rows of stitches 21 along the edge and stitches 22 at the bottom. Thus, hook strip 14 and loop strip 18 coact to form a hook and loop fastener for detachably securing the free ends at stitches 16 and 22 together.

Figure 2:
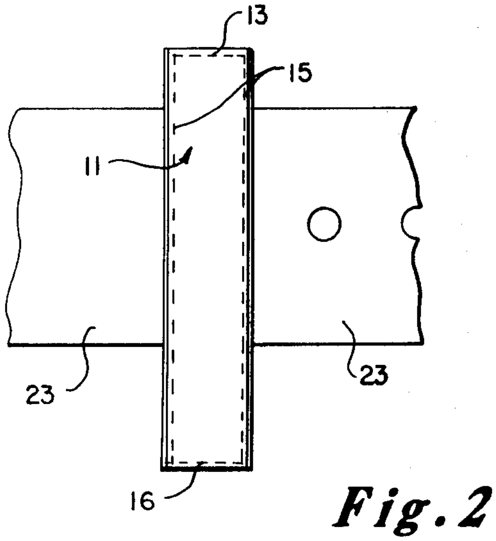
FIG. 2 is a perspective view of the embodiment of FIG. 1 shown surrounding a belt to enhance the visibility of the wearer.

Referring to FIG. 2, there is shown a perspective view of the embodiment of FIG. 1 surrounding a portion of a belt 23 with the free ends at stitches 16 and 22 fastened together. The invention may also be looped through shoestrings, shoestraps, baggage handles, automobile or other handles and numerous other items where it is desired to enhance visibility. Other specific means may be used for detachably securing the free ends of the strips together and securing the other ends together permanently, such as adhesive. Stitching is advantageous because the components may be rapidly and inexpensively assembled in secure relationship for long periods of time.

There has been described novel apparatus and techniques for enhancing visibility. It is evident that those skilled in the art may now make numerous uses and modifications of and departures from the specific embodiments described herein without departing from the inventive concepts. Consequently, the invention is to be construed as embracing each and every novel feature and novel combination of features present in or possessed by the apparatus and techniques herein disclosed and limited solely by the spirit and scope of the appended claims.

What is claimed is:

1. Apparatus for enhancing visibility comprising,
first and second flexible strips each having an outside retroreflective and inside nonretroreflective surface,
means for permanently fastening said first and second retroreflective strips together at one end with the inside nonretroreflective surfaces facing each other,
and means for detachably securing at least the free ends of said first and second retroreflective strips together.

2. Apparatus for enhancing visibility in accordance with claim 1 wherein said means for permanently fastening comprises thread stitching the strip ends together.

3. Apparatus for enhancing visibility in accordance with claims 1 or 2 wherein said means for detachably securing comprises hook and loop fastening means.

4. Apparatus for enhancing visibility in accordance with claims 1 or 2 wherein said means for detachably securing comprises,
a hook strip secured to the inside nonretroreflective surface of said first retroreflective strip,
a loop strip secured to the inside nonretroreflective surface of said second retroreflective strip,
said hook and loop strips coacting to form a hook and loop fastener.

5. Apparatus for enhancing visibility in accordance with claim 4 wherein the means for fastening said hook and loop strips to said first and second retroreflective strips respectively comprises thread stitching said first and hook strips together and said second and loop strips together along the edges of said strips.

6. A method for enchancing visibility comprising, first and second flexible strips each having an outside retroreflective and inside nonretroreflective surface, permanently fastening said first and second strips together at one end with the inside nonretroreflective surfaces facing each other, detachably securing at least the free ends of said first and second retroreflective strips together, sandwiching an item between said first and second retroreflective strips,
and fastening said free ends together so that said first and second retroreflective strips surround a portion of the item therebetween with said inside nonretroreflective surfaces facing said item.

* * * * *